United States Patent
Gudmundsson et al.

(10) Patent No.: US 12,436,138 B2
(45) Date of Patent: Oct. 7, 2025

(54) NON-IMMERSIVE METHOD AND APPARATUS FOR QUANTITATIVE ANALYSIS OF LIQUID METALS AND ALLOYS

(71) Applicant: DTE EHF., Reykjavik (IS)

(72) Inventors: Sveinn Hinrik Gudmundsson, Mosfellsbaer (IS); Jon Matthiasson, Reykjavik (IS); Kristjan Leosson, Reykjavik (IS)

(73) Assignee: DTE EHF., Reykjavik (IS)

( * ) Notice: Subject to any disclaimer, the term of this patent is extended or adjusted under 35 U.S.C. 154(b) by 656 days.

(21) Appl. No.: 17/615,572

(22) PCT Filed: May 31, 2019

(86) PCT No.: PCT/EP2019/064229
§ 371 (c)(1),
(2) Date: Nov. 30, 2021

(87) PCT Pub. No.: WO2020/239239
PCT Pub. Date: Dec. 3, 2020

(65) Prior Publication Data
US 2022/0236247 A1     Jul. 28, 2022

(51) Int. Cl.
    *G01N 21/71*        (2006.01)
    *G01J 3/443*        (2006.01)
    *G01N 33/205*       (2019.01)

(52) U.S. Cl.
CPC ............ *G01N 33/205* (2019.01); *G01J 3/443* (2013.01); *G01N 21/718* (2013.01)

(58) Field of Classification Search
None
See application file for complete search history.

(56) References Cited

U.S. PATENT DOCUMENTS 10,222,337 B1 *    3/2019    Yoo .................. H01J 49/105
2003/0071216 A1    4/2003    Rabolt et al.
(Continued)

FOREIGN PATENT DOCUMENTS

CN        102109465 A      6/2011
EP          0184590 A1       6/1986
(Continued)

OTHER PUBLICATIONS

International Search Report and Written Opinion dated Aug. 9, 2019 for corresponding International Application No. PCT/EP2019/064229.
Aragon, C., et al. (1993). "Determination of Carbon Content in Molten Steel Using Laser-Induced Breakdown Spectroscopy." The Society for Applied Spectroscopy, vol. 47(5), pp. 606-608. doi:10.1366/0003702934067324.
(Continued)

*Primary Examiner* — Erica S Lin
(74) *Attorney, Agent, or Firm* — Tarolli, Sundheim, Covell & Tummino LLP (57) ABSTRACT

A non-contact, non-immersive method and apparatus are provided for accurately measuring quantitatively one or more elements in liquid metal or alloy samples using laser-induced breakdown spectroscopy (LIBS). The method is particularly useful for process and/or quality control within the metallurgy industry for accurately and very quickly measuring minor component or impurity elements in liquid metal in the production process, without touching the liquid metal and without the need for cooling and solidifying samples for analysis. In the method and apparatus a predetermined distance is dynamically maintained between emission receiving optics and the surface of a liquid sample being analysed and the instrument does not come in contact with the liquid metal surface. Liquid samples are heated and/or maintained at a desired temperature. For many elements, values for limit-of-detection, measurement repeatability and accuracy about or below 1 ppm are achieved using this method.

30 Claims, 8 Drawing Sheets

(56) References Cited

U.S. PATENT DOCUMENTS

| | | |
|---|---|---|
| 2003/0174325 A1 | 9/2003 | Zhang |
| 2003/0234928 A1 | 12/2003 | Lucas |
| 2006/0250614 A1* | 11/2006 | Plessers ............... C21C 5/4673 356/318 |
| 2007/0135999 A1 | 6/2007 | Kolatt |
| 2008/0100836 A1 | 5/2008 | Hagler |
| 2011/0100967 A1 | 5/2011 | Yoo et al. |
| 2011/0237446 A1 | 9/2011 | Treado et al. |

FOREIGN PATENT DOCUMENTS

| | | |
|---|---|---|
| EP | 1584893 A1 | 10/2005 |
| JP | H0815153 A | 1/1996 |
| JP | 2015506484 A | 3/2015 |
| WO | 2007012440 A1 | 2/2007 |
| WO | 2012040769 A1 | 4/2012 |

OTHER PUBLICATIONS

Gruber J et al: "Rapid in-situ analysis of liquid steel by laser-induced breakdown spectroscopy", Spectrochimica Acta. Part B: Atomic Spectroscopy, New York, NY, US, US, vol. 56, No. 6, Jun. 29, 2001 (Jun. 29, 2001), pp. 685-693, XP027379627, ISSN: 0584-8547.

Aragon C et al: Improvements in Quantitative Analysis of Steel Composition by Laser-Induced Breakdown Spectroscopy at Atmospheric Pressure Using an Infrared Nd: Yag Laser, Applied Spectroscopy, the Society for Applied Spectroscopy. Baltimore, US, vol. 53, No. 10, Oct. 1999 (Oct. 1999), pp. 1259-1267, XP000903123, ISSN: 0003-7028, DOI: 10.1366/0003702991945506.

Rai Awadhesh K et al: "High temperature fiber optic laser-induced breakdown spectroscopy sensor for analysis of molten alloy constituents", Review of Scientific Instruments, AIP, Melville, NY, US, vol. 73 , No. 10, Oct. 2002 (Oct. 2002), pp. 3589-3599, XP012039425, ISSN: 0034-6748, DOI : 10.1063/1.1505101.

* cited by examiner

NON-IMMERSIVE METHOD AND APPARATUS FOR QUANTITATIVE ANALYSIS OF LIQUID METALS AND ALLOYS

RELATED APPLICATIONS

The present application is a U.S. National Stage application under 35 USC 371 of PCT Application Serial No. PCT/EP2019/064229, filed on 31 May 2019 which is incorporated herein by reference.

TECHNICAL BACKGROUND

Laser-Induced Breakdown Spectroscopy, LIBS, is an atomic emission spectroscopy technique which uses high-energy laser pulses to excite a sample, creating a plasma composed of matter in a highly excited energy state and detecting light emitted from the plasma during its subsequent relaxation, which includes spectrally narrow emission characteristic of the elements in the sample. LIBS provides a fast and versatile analytical method for samples in the solid, liquid or gas phase as there is generally no need for sample preparation. However, in terms of quantitative analysis, LIBS has to date had limited success and has generally been considered inferior to other elemental analytical techniques such as Spark Optical Emission Spectroscopy (Spark OES or Arc-spark OES), inductively coupled plasma-atomic emission spectroscopy (ICP-AES) and inductively coupled plasma mass spectrometry (ICP-MS). While the first-mentioned technique is applied in particular to solid samples, the other two methods require that the sample be introduced to an inductively coupled plasma, typically in a dissolved sample.

Elemental analysis in metal production, such as in aluminium plants, steel smelters and the like thus quite often involves taking samples of liquid metal at different stages of the production process, solidifying the metal and analysing the solid samples. It would, however, be highly advantageous to be able to accurately analyse the elemental composition of liquid metals with high precision quantification. Furthermore, it would be advantageous to obtain accurate quantification without having to immerse a sample probe into the liquid metal. Prior art describing such immersive probes has not demonstrated sufficiently high levels of measurement accuracy for analysis of pure metals, in addition to requiring routine cleaning and/or replacement of the immersive probes.

SUMMARY

The present invention is specified in the claims as well as in the below description. The invention provides a novel non-contact, non-immersive method and apparatus for accurately measuring quantitatively one or more elements in a liquid metal or alloy sample using LIBS. The method is particularly useful for process and/or quality control within the metallurgy industry such as but not limited to aluminium plants, steel plants, ferrosilicon plants, and essentially any other industry where an accurate and precise quantitative analysis of liquid metal or alloy is desired, without having to immerse a probe into the liquid metal, and without having to cool down and solidify a metal sample.

The invention provides a modified method and apparatus based on the LIBS technology, by which quantitative analysis of elements in molten metal samples is achieved with far greater accuracy and precision than has been achieved until now with other analytical method directly applied to liquid metal or alloy samples. Low limit of detection (LOD) values, as low as 1 ppm or sub-ppm for some elements, high measurement repeatability and measurement accuracy are obtained. The features and detailed embodiments described herein below refer generally to both the method and apparatus of the invention.

The method of the present invention comprises obtaining a sample of the liquid metal or alloy to be analysed and placing in a sample container (or using directly as sample container a source of the liquid metal or alloy within a process or production facility such as a trough, crucible or the like). This can advantageously be done for example but not limited to using a robot arm adjacent to the source of the liquid metal or alloy to be analysed, the robot arm holding a crucible or other liquid containment to obtain a portion of material such as by scooping up a suitable quantity of sample and pouring into the sample container. Sampling can also be done by manually scooping up a sample of liquid metal. The sample container is not specified to particular dimensions or shape, but is substantially upwardly open, and allows the sample to be heated or maintained within a desired temperature range.

The term 'crucible' as used herein refers generally to a container that can withstand very high temperatures and can hold liquid metal, and can refer both to small size crucibles, such as for holding a few mL or dL of liquid, and also to large size industrial crucibles, that in some cases can hold a ton or more of material.

An instrument head is positioned in relation to the sample container, either by moving the instrument head or the sample container or both, such that the instrument head is above the sample surface. The instrument head comprises laser excitation optics that are connected to a suitable LIBS excitation laser and receiving optics for receiving emission from the sample and transmitting to a detector. This includes and is not limited to all variations of LIBS methodology known in the art, including but not limited to the use of dual collinear or non-collinear pulses, combined LIBS/electrical discharge methods, detection with a mechanically shuttered CCD camera, electronically gated ICCD camera, linear detector array, or the like.

An important feature of the invention is that the receiving optics are highly accurately positioned for every single measurement at a pre-determined distance from the sample surface. This is preferably done by having a distance sensor in the instrument head that is directed towards the sample surface through the opening on the sample container. Output from the distance sensor is transmitted to a computer that controls movement by a movement mechanism of the instrument head, receiving optics and/or the sample container to adjust the distance to the desired value.

One or more laser pulses are emitted on the sample through the excitation optics, and light emitted from the sample is received through the receiving optics and transmitted to a detector for recording spectral information of the detected light. From the spectral information one or more emission peaks are then analysed and compared to calibration values in order to obtain quantitative determination of one or more elements.

The sample container that is used in the invention can be of any of various types and configurations but should be suitable for holding a sample of liquid metal and thus able to withstand high temperatures, which are sufficient to maintain metal or alloy samples to be analysed in molten state. As mentioned above, the sample container is substantially upwardly open, meaning that a sufficient portion of the surface of a sample in the container should be exposed to the excitation laser and a portion of emitted light from the sample resulting from the laser excitation must reach the receiving optics. Also, in the case where a distance meter is applied to measure the distance to the sample surface as further described below, the distance meter needs an unblocked path towards the sample surface. Depending on the size and shape of the sample container, the top end of the container may in some embodiments be fully open so that substantially the entire surface of a sample is exposed, in other embodiments the top is partially closed, such as but not limited to 30% closed or 40% closed, 50% closed or 60% closed or 75% closed, but such that the above criteria of necessary access to the sample surface are met.

It is a premise of the method that the sample should be maintained at or above a desired temperature. This involves in some embodiments that the sample container is actively heated, either continuously or periodically, such as during sample introduction and/or in the period leading up to the analysis. In some embodiments the sample container is pre-heated to ensure that the sample maintains a substantially steady temperature or at least does not cool down too rapidly. In another embodiment the sample in the sample container is heated through induction heating, such that heat is transmitted inductively to the sample but not to the container itself except as transmitted from the sample. In some embodiments such induction heating is turned off during the sample analysis, i.e. when spectral emission from the sample plasma is being detected/recorded.

In some embodiments the sample is heated or maintained at a temperature above at least 400° C., such as above at least 600° C., such as above at least 700° C. or above at least 800° C. The desired optimal temperature may depend on in particular, the specific type of metal or alloy being detected, and the melting point of that metal or alloy. Accordingly, in some embodiments the sample is heated to or maintained at a temperature of at least 400° C. or at least 450° C., or at least 500° C. or at least 550° C. or at least 600° C. For certain metals and alloys an even higher temperature is needed to maintain a sample in molten state, and thus in some embodiments the sample is heated to or maintained at a temperature of at least 850° C. or at least 900° C. or at least 1000° C.

As a non-limiting example, for sampling and analysing aluminium an optimal temperature of the sample may lie in the range from about 680° C. to about 780° C., such as in a range from about 680° C. or from about 700° C. to about 780° C. or to about 760° C. or to about 750° C.

The sample container can have a different size, in order to accommodate a sample of suitable volume, depending on the configuration used to obtain the sample, etc. In some embodiments the volume of the sample that is placed in the sample container is in the range from about 1 mL to about 1000 mL, such as in a range from about 2 mL, or from about 5 mL, or from about 10 mL or from about 20 mL to about 200 mL, or to about 100 mL, or to about 75 mL or to about 50 mL, such as about 10 mL, about 15 mL, about 20 mL, about 25 mL, about 40 mL or about 50 mL. The sample container is preferably sized in accordance with the desired maximum amount of sample to be contained therein.

In certain embodiments the heating of the sample container is provided by placing the container in contact with the surface of an adjacent source of liquid metal or alloy, such as in a trough that the sample is being taken from. This means that the sample container is suitably configured for such heating and is arranged on a suitably configured moveable platform (e.g. extending moveable arm, hooks or the like) to bring the container towards the surface and/or maintain the container at desired contact with the surface for at least a period of time. In these embodiments it is preferred that the instrument head and/or optics unit be moveable so that it can be kept at safe distance from the liquid metal source at other times than during measurement.

As mentioned above the step of obtaining a sample of the liquid metal or alloy to be analysed can be done with various methods. In one embodiment of the method a robot arm cooperates with the analytical apparatus and holds a crucible for scooping a suitable amount of sample from a trough or other source of liquid metal, and places the sample in the sample container. In some embodiments a crucible used for obtaining the sample functions as the sample container itself, this can be for example in the above described embodiments where the sample container is maintained at a desired temperature by immersing it partially in an adjacent source of liquid metal or alloy. Thus, in such embodiments a crucible can be immersed in the trough to fill it with liquid material and raised but only to such degree that the bottom of the crucible is still immersed in the material flow in the trough. In another embodiment the sample is manually scooped from the sample source and placed in the sample container. In yet another embodiment a quantity of the liquid metal is allowed to flow in a designated channel into the sample container. This can be done for example by having a controllable valve opening or closing a passage for a portion of the liquid to be analysed to flow into the channel and then the portion flows through the channel to the sample container, which can be configured as a channel or reservoir. When the sample is analysed, the sample flow into or through the sample container is stopped, to maintain a steady sample surface. Another channel or a continuation of a channel or reservoir forming the sample container can be used to direct sample out of the sample container, or in another embodiment the sample is allowed to cool and discarded when solid.

It is an advantage of the method and apparatus of the invention that in preferred embodiments the reproducibility in sample collection, handling and analysis is optimized. Thus, preferably the steps including sample collection, sample heating (or maintaining at or above desired temperature) and sample analysis are performed substantially similar, meaning that the same or substantially similar volume of sample is collected and placed in the sample container, samples are held at the same or substantially similar temperature, the environment above the sampling point (i.e. the local atmosphere at and immediately above the sampling point) is kept substantially similar, etc. in addition to the same or essentially similar pre-determined distance from the receiving optics to the sample surface, for different successive samples. To achieve this, the steps including sample handling are preferably automated, as further described herein for the method of the invention.

In some embodiments the method comprises a step of removing a top surface layer of the metal sample, in particular where the sample may have had to wait, in between sampling and analysis, such that a crust or film has formed on the surface. In some embodiments this is done with a scraper such as in particular an automatic scraper that moves along the surface just prior to analysis.

An important feature of the invention is the accurate positioning of the receiving optics and/or sample container to have a pre-determined distance from the receiving optics to the sample surface. This can be suitably done by having a distance sensor within the instrument head in fixed relation to the receiving optics, which sensor is directed towards the open portion of the sample container such that the sensor measures a distance to the sample surface exposed in the opening. The output from the distance sensor is transmitted to a control computer which is programmed to control a movement mechanism to move the receiving optics and/or the sample container as needed based on the distance meter output to attain the desired pre-determined distance.

In some embodiments the positioning of the receiving optics relative to the sample surface is achieved by moving the sample container. In other embodiments the positioning is achieved by moving the receiving optics.

In one embodiment the laser excitation optics and receiving optics are fixedly arranged in an optics units comprised in the instrument head and the positioning comprises positioning the optics unit. This is in some embodiments configured such that the entire instrument head need not be moved in the step of positioning but rather that an internal unit comprising the optics unit is moved within the instrument head. In other embodiments however the receiving optics are positioned by moving the instrument head including the excitation and receiving optics. It is an advantage of the inventive method that the positioning is very precise and preferably the receiving optics are positioned at the pre-determined distance from the sample surface with a margin of less than ±50 µm and preferably within a margin of less than ±25 µm and more preferably within a margin of less than ±15 µm and yet more preferably within a margin of less than ±10 µm, such as within a margin of less than ±5 µm, or a margin of less than ±3 µm or a margin of less than ±2 µm.

In some embodiments such accurate positioning is achieved by using a servo motor cooperating with suitable gear mechanism to move the moveable internal unit/moveable platform. An electromagnetic coil or other means of translational movement may also be used, including a stepper motor. The distance sensor and control computer can advantageously be configured to operate dynamically, such that during operation and processing and analysing a sample, the sensor is continuously operating and measuring the distance to the sample surface and based on the feedback from the sensor the control computer essentially continuously adjusts the distance as needed.

In some embodiments a sample need not be retrieved from a source but rather a source container by itself is used as a sample container. This can advantageously be done when an apparatus of the invention (more specifically the instrument head of an apparatus) can be placed adjacent to an open trough, crucible or the like source of liquid metal or alloy to be analysed. Thus, for example the apparatus can be configured such that the instrument head can extend telescopically over an open trough or crucible within a production or processing facility. In other embodiments a special dedicated sampling trough can be arranged to function as a sample container, which sampling trough receives a portion of material such as a part of a flowing stream, such that a representative portion passes in the sampling trough under the instrument head. For these embodiments, it is very advantageous that the receiving optics be placed with accurate pre-determined distance from the sample surface (liquid surface in the source underneath the instrument head) as described above. Preferably the positioning is dynamically controlled, such that the pre-determined distance is continuously monitored during measurement and adjusted as necessary.

It is advantageous that the local environment/atmosphere at and immediately above the spot to be sampled (i.e. the spot on a liquid surface where the laser pulse interacts with the sample) is substantially consistent during repeated measurements. This can be achieved for example but not limited to one or more of ensuring consistent energy of laser pulses, applying one or more pre-pulses prior to analysis, and in preferred embodiments inert atmospheric conditions are maintained. Accordingly, in preferred embodiments a stream of inert gas, such as Argon or Nitrogen, is applied to the point of sampling, for example through a open-bottom chamber as is explained below.

The apparatus and method of the invention uses a laser suitable for LIBS technology, which is as such well known in the art, such as but not limited to a pulsed Nd:YAG laser, with suitable pulse duration, repetition rate and pulse energy. Other types of laser can be used, such as $CO_2$ or excimer lasers, or a laser based on optical fiber or dye technology.

Generally, the apparatus of the invention comprises:
an instrument head comprising laser excitation optics and receiving optics,
a pulsed laser connected to said laser excitation optics,
a spectrograph for resolving received emission,
a detector connected to said spectrograph for recording spectral information, wherein the receiving optics are arranged on a vertically moveable support, and the receiving optics having an associated distance sensor for measuring a distance to the surface of a sample in the sample container so that the receiving optics can be positioned at a predetermined distance from the surface of a sample in the sample container.

The apparatus is in some embodiments built to be used in a fixed location, such as but not limited to the vicinity of an open trough or crucible in a metal production or processing plant. In other embodiments the apparatus is built to be easily transportable or portable, e.g. on a platform that can be rolled from one sampling point to the other. In particular, embodiments of the apparatus that do not comprise a heated sample container as part of the apparatus but rather that analyse the liquid metal directly in a trough or crucible in a metal plant can readily be configured in a portable version. However, portable embodiments are not limited to such configurations.

As mentioned above, the receiving optics can be moved either as part of an internal laser optics unit and/or sampling head unit, or the instrument head unit as such can be moved in order to accurately adjust the position of the receiving optics and the pre-determined distance to the sample surface in particular.

The receiving optics which preferably comprise one or more lenses are in some embodiments configured so as to cover a relatively wide solid angle of emission from a plasma plume created at the sample surface by the excitation laser. This is suitably achieved by having suitable receiving optics such as a lens or concave mirror, positioned at a relatively close distance to the spot where the excitation laser interacts with the sample. In certain embodiments the receiving optics are placed at a distance from the sample surface in the range from about 5 mm to 100 mm, such as in the range from about 5 mm, or from about 10 mm or from about 15 mm or from 20 mm or from about 25 mm or from about 30 mm, to about 100 mm, or to about 90 mm or to about 80 mm or to about 75 mm or to about 60 mm or to about 50 mm or to about 40 mm.

In some embodiments the optical axis of the receiving optics is at an angle relative to the optical axis of the excitation optics and/or relative to the normal line of the sample surface. Thus, typically, the receiving optics may comprise a lens that is positioned at the mentioned angle with respect to the excitation optics (the optical axis of the receiving optics lens is at said angle with respect to the angle of the excitation optics). For example, the excitation optics may comprise a lens for focusing the excitation laser beam such that the beam is directed substantially orthogonal to the sample surface, while the receiving optics comprise a lens positioned so as to receive a light cone centred at an angle in the range of about 30-75° with respect to the sample surface, such as at a range from about 30°, or from about 35° or from about 40° or from about 45°, to about 75° or to about 70° or to about 65° or to about 60° or to about 55° or to about 50° or to about 45°.

In some embodiments the receiving optics comprise more than one lens, the lenses are preferably arranged radially around the point of contact of the laser pulse and sample surface. Thus the receiving optics can comprise a plurality of lenses arranged at the same or different angles with respect to the sample surface. Light collected by the different lenses can be transferred via fiber optics or other optical transmission means to the same spectrometer or to different spectrometers (for example, each lens transfers light to its respective spectrometer). In some embodiments such plurality of spectrometers is configured so that each spectrometer collects emission at a limited wavelength range, so that the plurality of spectrometers together cover the entire desired wavelength range. In some embodiments, spectroscopic detection may also comprise detection of selected wavelength bands using one or more suitable bandpass filters and optical sensors.

In useful embodiments the instrument head comprises a bottom surface that faces the sample surface during measurement, which surface comprises an open-bottom chamber which is a chamber for accommodating the plasma, providing plasma confinement and stable environmental conditions surrounding the plasma plume. A laser beam channel extends from the laser excitation optics to the chamber, through which channel the laser beam passes to the sample. An emission receiving channel extends from the chamber towards the receiving optics. Thus, in the embodiments when the receiving optics are arranged to receive a light cone at angle with respect to the laser beam, the emission receiving channel is preferably configured with its main axis having the same angle as the optical axis of the receiving optics. Preferably the instrument head further comprises a gas channel with an opening in the chamber and/or in the emission receiving channel to deliver a stream of inert gas from an inert gas source. This maintains a slight overpressure within the chamber and emission receiving channel, ensures a substantially consistent and non-reactive gaseous environment above the sampling point, and aids in protecting the optics from heat and splashes. Accordingly, the chamber has a size suitable to accommodate the formed plasma plume but sufficiently small to maintain an overpressure, with a gentle stream of inert gas (e.g. Argon, Helium or Nitrogen). In some embodiments the chamber has a diameter in the range 10-25 mm. The bottom surface of the instrument head must withstand heat from the adjacent sample surface, and is preferably made from a ceramic or other heat-sustaining material. Cooling means are preferably applied, such as but not limited to channels for a cooling liquid or cooling gas.

Emission received through the receiving optics is guided, preferably through an optical guide, such as a fiberoptic guide, preferably to a spectrograph which generally includes one or more diffracting elements, such as but not limited to a Littrow, Paschen-Runge, Echelle, or Czerny-Turner spectrograph. The spectrograph produces a resolved emission spectrum which is transmitted to a detector, which in preferred embodiments comprises a time-gated CCD camera. The optimum optical detection methods and subsequent processing of detected emission are as such known to the person skilled in the art.

Preferably, the apparatus comprises a computer that receives and processes the spectral data from the detector. The computer is advantageously programmed to process the data, including normalising spectra, assigning relevant peaks, calculating signal strength, and calibrating compared to reference values.

The method and apparatus of the invention are not limited to analysis of particular elements. In some embodiments the method and/or apparatus is for determining in the liquid metal or alloy sample the concentration of one or more elements selected from Aluminium, Silicon, Phosphorus, Sulphur, Chloride, Calcium, Magnesium, Sodium, Titanium, Vanadium, Chromium, Manganese, Iron, Cobalt, Nickel, Copper, Zinc, Zirconium, Niobium, Molybdenum, Ruthenium, Rhodium, Palladium, Silver, Cadmium, Tin, Antimony, Wolfram, Rhenium, Iridium, Platinum, Gold, Mercury, Lead and Bismuth. The method is also suitable for quantifying very light impurity elements such as Lithium, Beryllium and Boron that are difficult to detect with certain other analysis methods.

BRIEF DESCRIPTION OF FIGURES

The skilled person will understand that the drawings, described below, are for illustration purposes only. The drawings are not intended to limit the scope of the present teachings in any way.

DETAILED DESCRIPTION

The invention is described in further detail with reference to the accompanying drawings which are not to be construed as limiting the overall scope of the general concept of the invention. In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
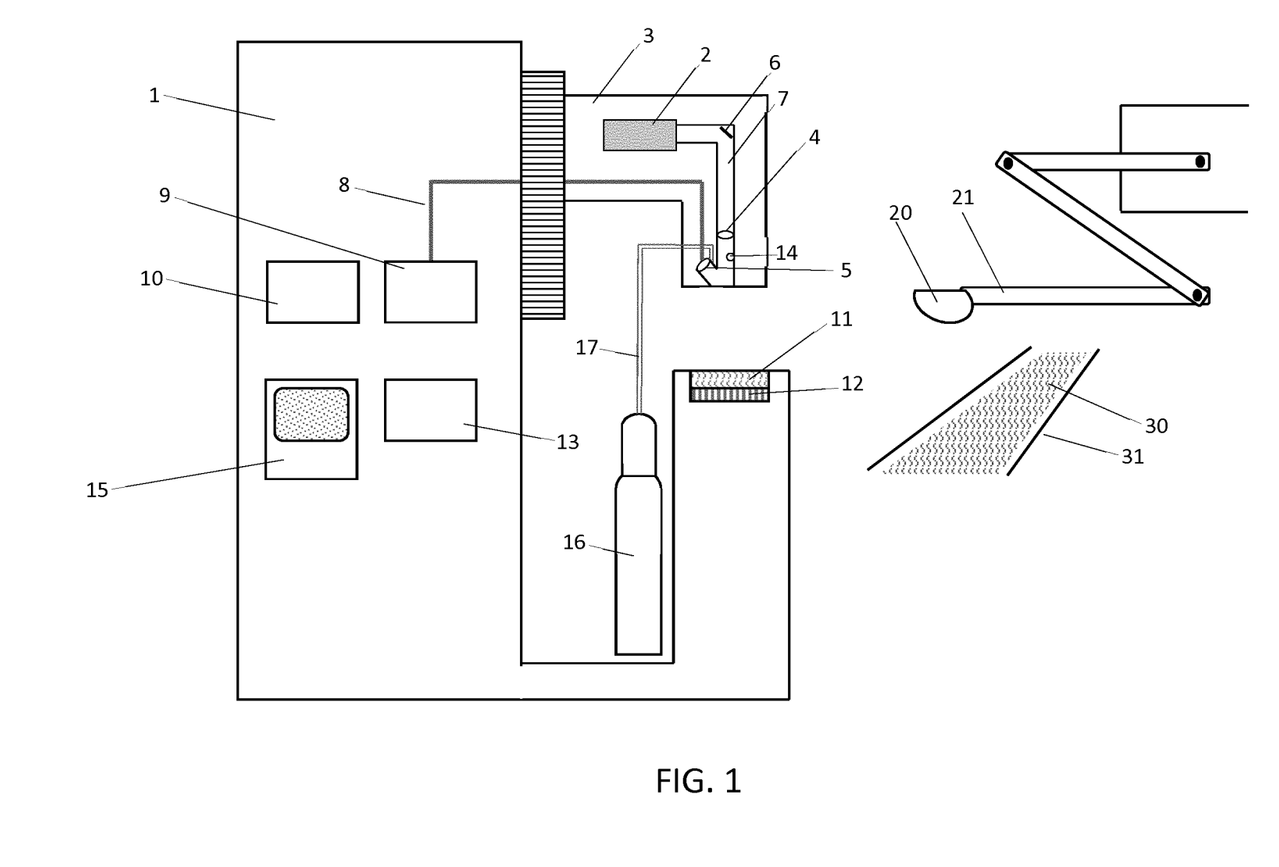
FIG. 1 shows a schematic overview of an instrument of the invention, with a heated sample container.

FIG. 1 illustrates an embodiment of an apparatus 1 of the invention that comprises an excitation laser 2 which is arranged inside an instrument head 3. The laser emits light that is transmitted through an optical pathway 7, a mirror 6 reflects the light in this configuration where the path lies at an angle, the light beam is directed to laser excitation optics 4, which comprises a focusing lens that focuses the beam on the sample surface or in proximity thereto. Receiving optics 5 are arranged to receive emission from a sample plasma created by the interaction between the excitation laser and sample. A distance sensor 14 is arranged in fixed relation to the receiving optics and excitation optics. The receiving optics 5 transmits received emission light through an optical guide 8 to a spectrograph 9 which is connected to a CCD camera 10. A sample container 11 is heated with heating element 12. Distance sensor 14 measures a distance to the surface of a sample of liquid metal in the sample container. The distance sensor transmits signals to a control unit 13 (PLC computer). The control unit adjusts dynamically the vertical position of the instrument head with movement actuators (not shown) to maintain an exact pre-determined distance to a sample surface. In this configuration the instrument head is also moveable horizontally. Computer 15 controls the laser operation and detection components (spectrograph and CCD camera) and processes and analyses the obtained data. Sample container 11 is configured to receive and hold a sample of liquid metal. Heating element 12 ensures that the sample is maintained at a desired temperature. A sampling device 20/21 is shown above a trough 31 with a flow of liquid metal 30. A gas cylinder 16 with inert gas (preferably Argon) is connected via a gas channel 17 to transmit regulated gas flow into an emission receiving channel 19 that accommodates the receiving optics. The emission receiving channel extends from an open-bottom chamber 18 configured to contain the plasma during the measurement.

Figure 2:
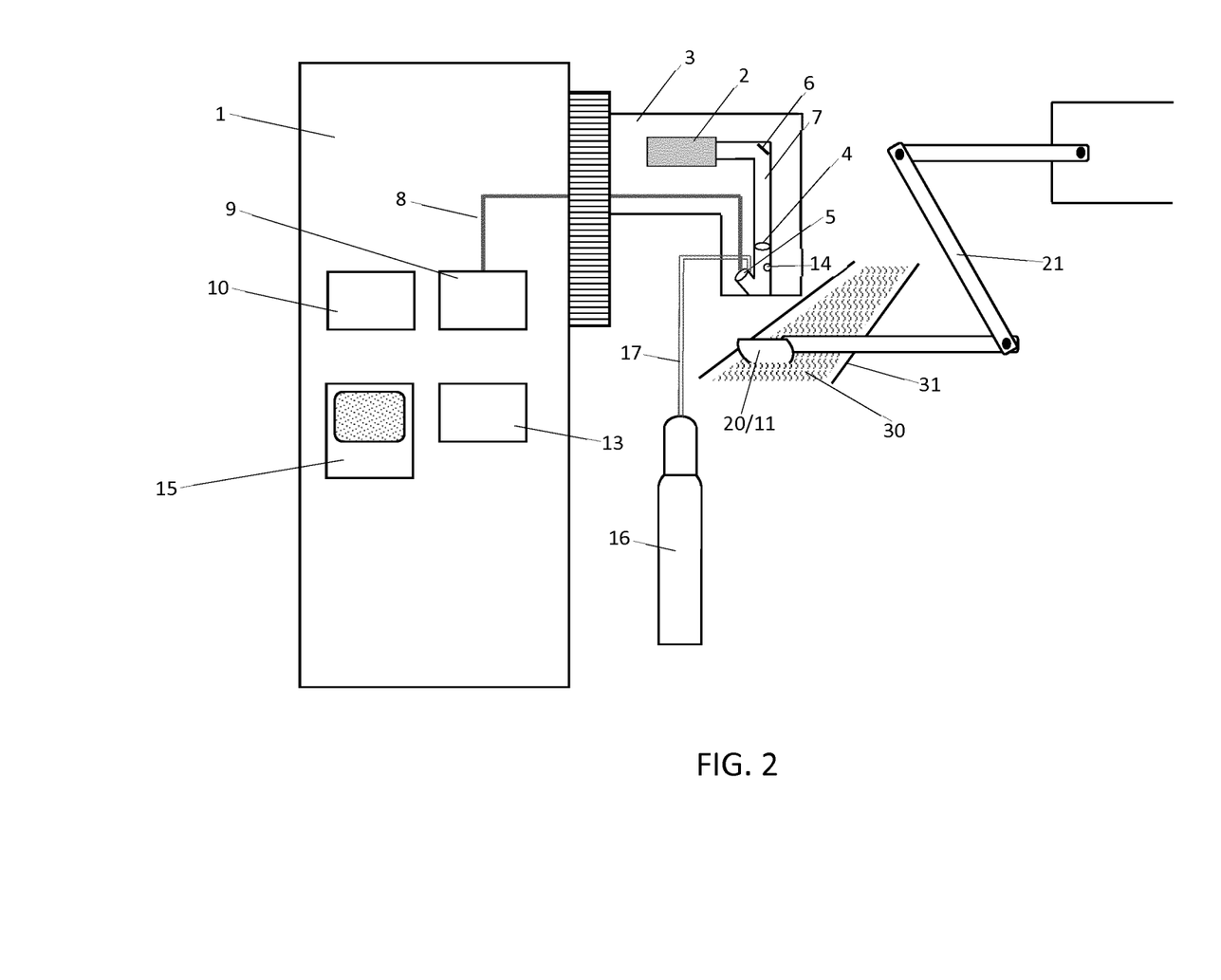
FIG. 2 shows another embodiment of the instrument of the invention, with a sample container heated in a source of liquid metal.

FIG. 2 illustrates an alternative configuration wherein sampling scoop 20 is used as a sample container and heated by partially immersing in the liquid metal 30 in the trough 31. In this configuration the instrument head 3 can preferably extend telescopically from the main instrument body, to be positioned above the trough and withdrawn therefrom after analysis is completed.

Figure 3:
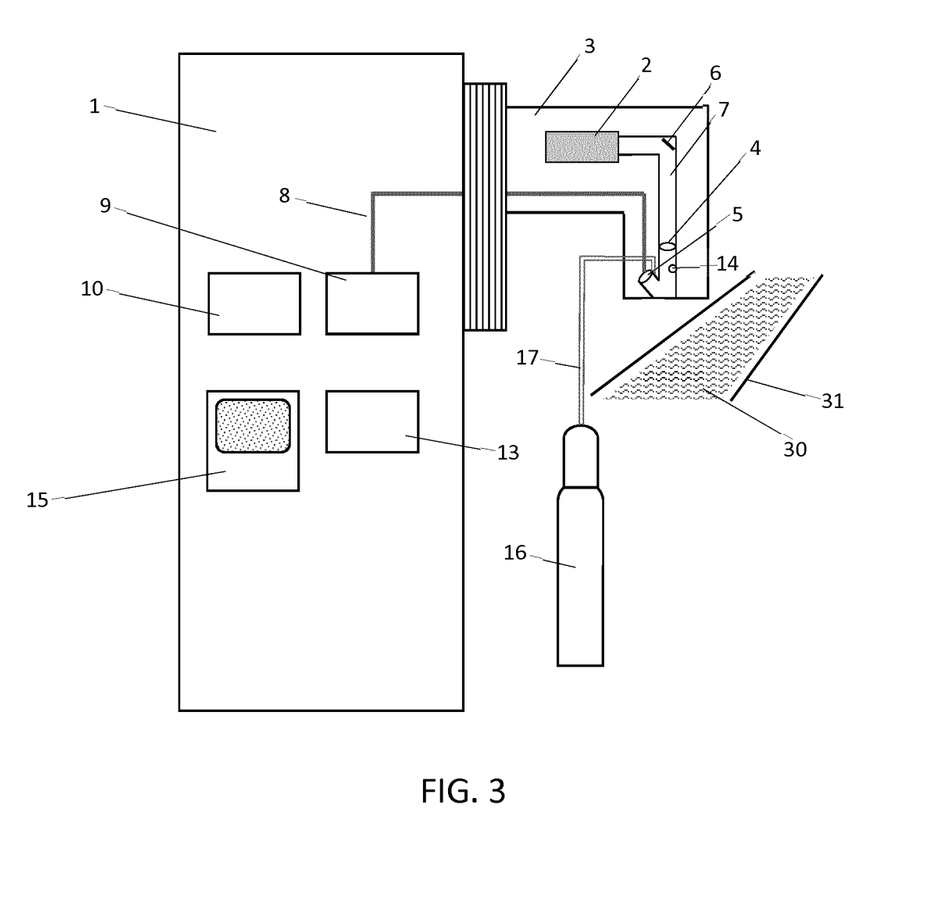
FIG. 3 shows another embodiment of the instrument of the invention, with a trough (launder) in a processing facility functioning as a sample chamber.

In FIG. 3, yet another alternative is shown where a specific sample container is not used but rather the trough in which liquid metal flows or is contained serves as a sample container. Thus, the instrument head is positioned above the surface of liquid material in the trough and the receiving optics are positioned at a pre-determined distance from the liquid surface, and preferably the pre-determined distance is dynamically maintained.

Figure 4:
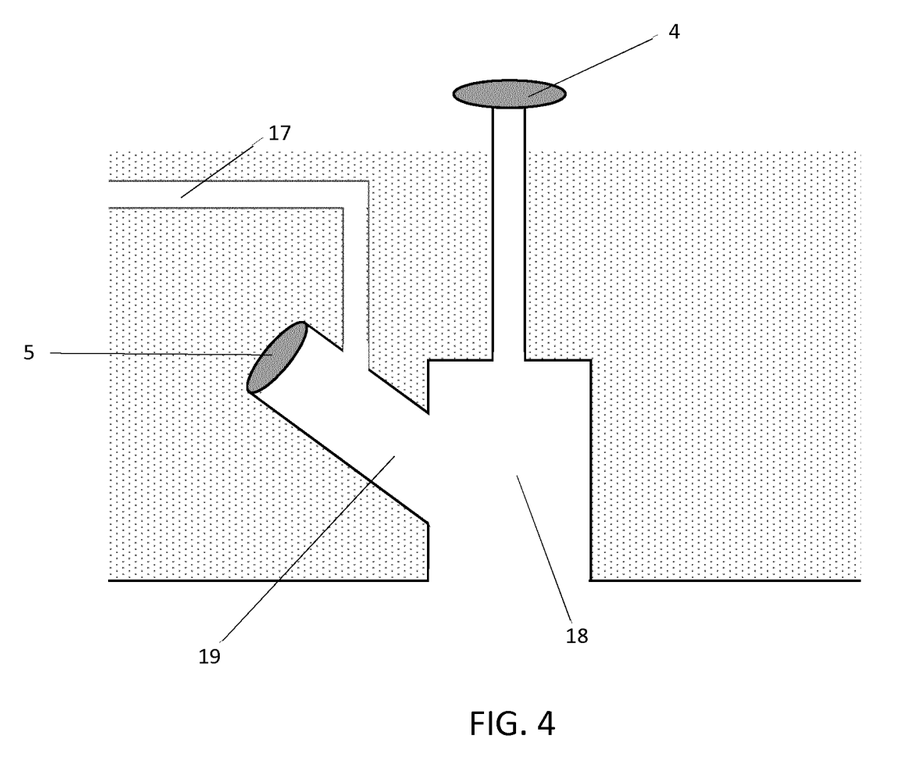
FIG. 4 shows a schematic overview of bottom end of the instrument head, showing the open-bottom chamber and optics.

FIG. 4 shows a schematic close-up view of the open-bottom chamber 18 at the bottom of the instrument head, with the emission receiving channel 19 extending at an angle from the chamber to lens acting as the receiving optics 5. Gas channel 17 feeds Argon gas with a controlled flowrate, to maintain a slight overpressure inside the chamber 18 and emission receiving channel 19. The optical pathway 7 extending from the laser excitation optics 4 to the open-bottom chamber is shown in this configuration as substantially narrower than the open-bottom chamber, as the laser excitation optics 4 (a lens in this configuration) focuses the laser light to a narrow beam path.

Figure 5:
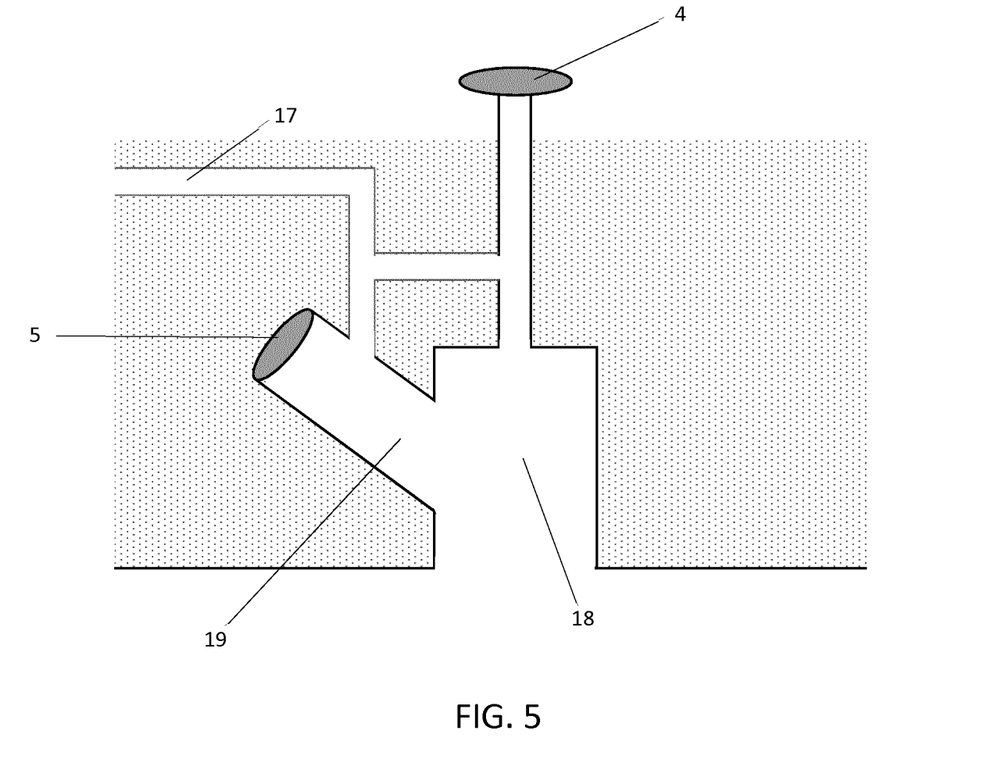
FIG. 5 shows another embodiment of the bottom end of the instrument head, with different layout in inert gas channels.

FIG. 5 shows an alternative arrangement of the chamber 18 and emission receiving channel 19, where the gas channel 17 splits and extends into both the chamber 18 and emission receiving channel 19.

EXAMPLES

A comparative study was performed to evaluate the results from a LIBS apparatus of the invention and compare to results obtained for the same samples using a high-end industry-standard OES system (Optical Emission Spectroscopy), a Bruker Q8 Magellan OES system in an aluminium plant, using standard sampling and measurement protocols.

The repeatability of measurements from the LIBS apparatus was compared with measurement from the Bruker OES, using the same sample material in each case. Three measurements at each concentration were performed with the LIBS apparatus in the melt and three measurements were carried out on corresponding solid samples in the OES. In this way, 11 elements were analysed in up to 150 samples having varying concentration levels of impurity elements. Analysis runs were carried out on-site over a period of three months.

Figure 6:
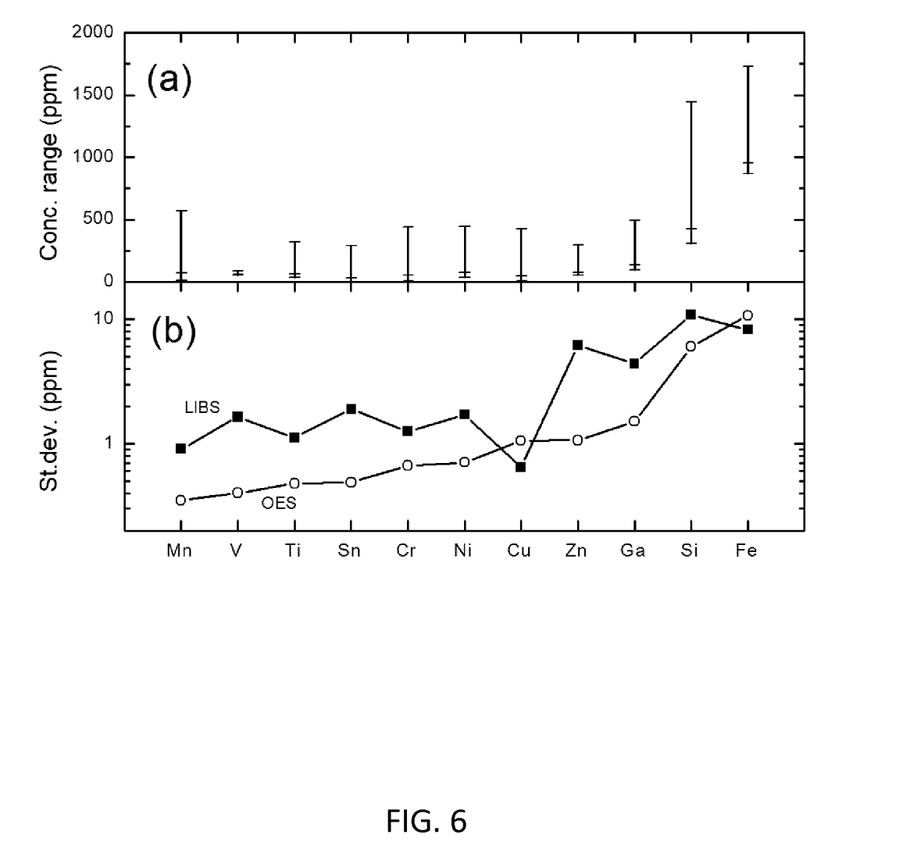
FIG. 6 Measured concentration values for listed elements with OES system and LIBS system of the invention.

The range of concentrations for the individual elements measured in this way are indicated by black lines in FIG. 6(a).

FIG. 6 (b) shows the variability in individual measurements of samples in the lowest 10% of the concentration range (lower set of horizontal bars in FIG. 6(a)) for the Bruker OES system (open circles) and the LIBS system (black squares) according to the present invention, confirming that for most of the investigated elements, the absolute standard deviation for both the LIBS system and the OES system is below 2 ppm. The high absolute variability for Si and Fe results from the high concentration of those elements in the measured samples. In both cases, the relative standard deviation (% RSD), for the LIBS system as well as the OES system, is of the order of 1% for Si and Fe. In general, both the absolute standard deviation and the % RSD are concentration-dependent. The LOD for each element in the case of LIBS measurements, estimated using least-squares fitting of calibration data using weighted errors and taking three standard deviations at the y-axis intercept as a measure of the LOD, is found to be of the same order as the measurement variability shown in FIG. 6(b).

The different degree of variability between elements for the LIBS measurements, shown in FIG. 6(b), is mainly (although not exclusively) dependent on the relative strength of the LIBS signal for a given elemental concentration. It should be noted that while this data is representative of the current configuration, there are still many opportunities to increase the detected signal strength, signal processing techniques and/or the number of samples in each measurement in order to reduce the variability and improve the LOD in the LIBS measurements. It should be emphasized that the number of laser pulses averaged in the LIBS measurement reported here is at least one order of magnitude lower than the number of sparks used in the OES measurement.

Figure 7:
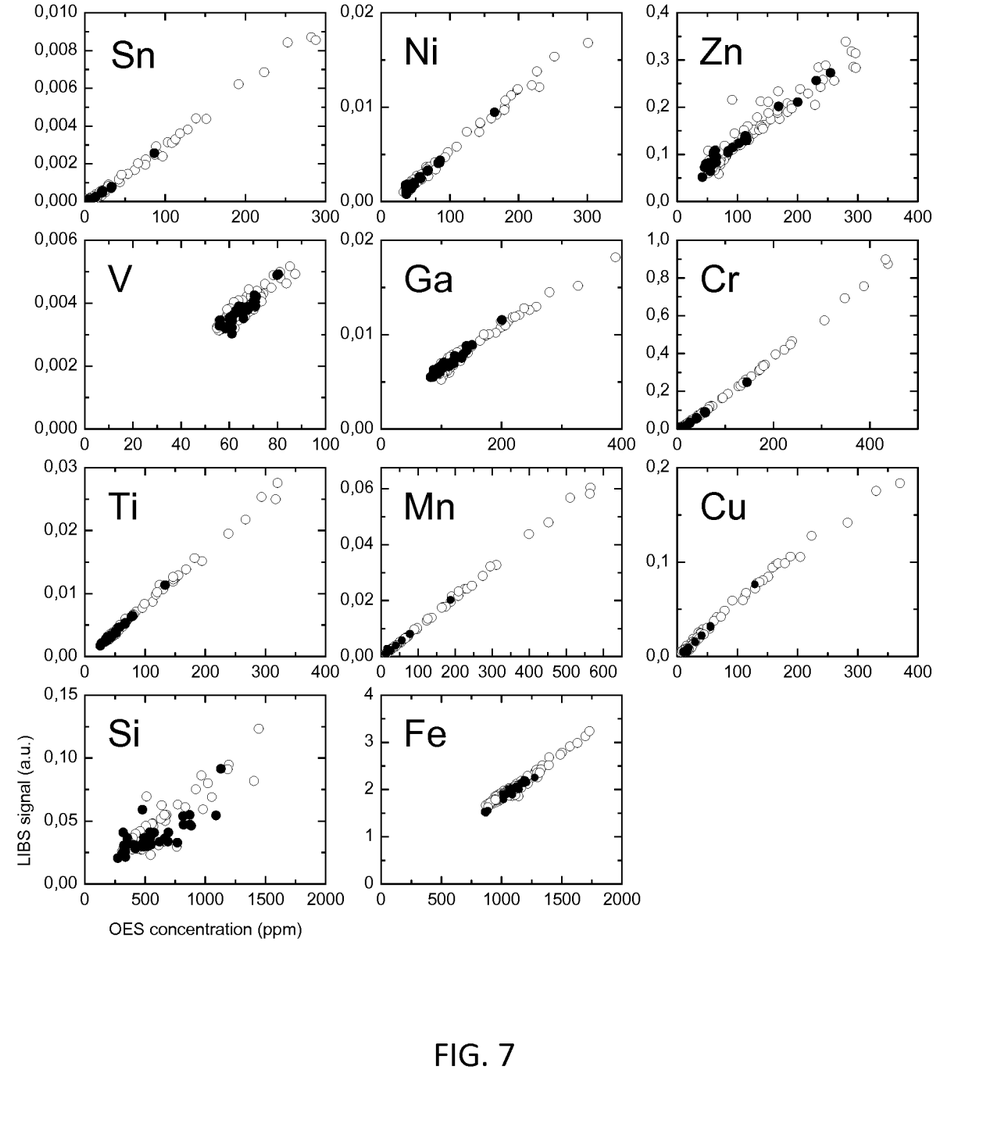
FIG. 7 shows correlation plots between data from a LIBS apparatus of the invention and comparative results from OES.

In order to evaluate measurement accuracy, the raw LIBS output data (normalized signal strength corresponding to each element, in arbitrary units) was calibrated against OES concentration measurements on the corresponding solid samples. FIG. 7 shows correlation plots between LIBS ("EA2000") and OES results. LIBS data was recorded over a 3-month period without recalibration of the equipment.

Open symbols represent data recorded within the 1st week of the measurement period that was used for calibration of the LIBS signals.

For most of the investigated elements, an excellent correlation between the OES-measured concentration and the LIBS signal is observed. It should be emphasized that the data was collected over a period of three months and that no recalibration of the LIBS system took place in this period while the OES system was recalibrated daily, in accordance with the smelter's procedures. The increased scatter in Si data (which is much larger than the variability of individual measurements) presumably relates to uncertainties arising in the sampling process itself that depends on the exact sampling, preparation and measurement procedure and is therefore potentially substantially random and operator-dependent. For Si and similarly behaving elements, a separate independent calibration of the LIBS apparatus is required to ensure optimum performance, using calibrated reference standards that can be measured in the liquid form. Such an approach will, in general, enable the LIBS apparatus to provide accurate concentration measurements for elements that are problematic when measured in the solid phase.

Figure 8:
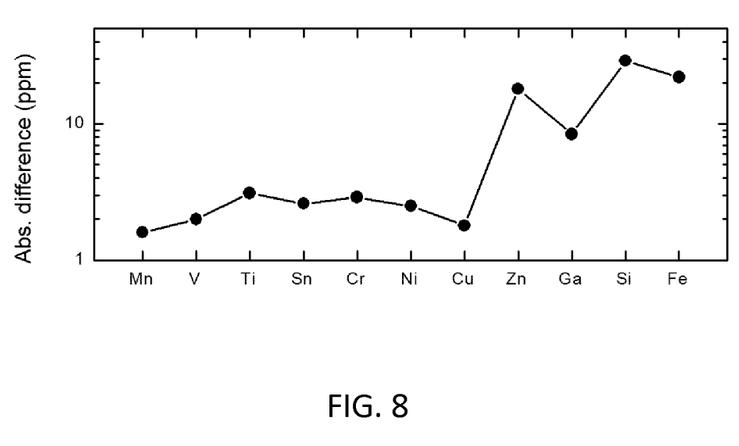
FIG. 8 shows average absolute difference in concentration measurements between the new LIBS apparatus and OES.

The LIBS apparatus was calibrated using a set of samples measured within a 1-week interval (represented with open symbols in FIG. 7). Later readings (black symbols in FIG. 7) correlated exactly with this initial data set, confirming that no significant drift of the LIBS signal took place over the full 3-month measurement period. In order to establish the accuracy of individual LIBS measurements, the average absolute deviation between calibrated LIBS readings (black symbols), typically covering the lower third of the calibration range, and the corresponding OES concentration measurements was calculated. Results are shown in FIG. 8, showing that the LIBS and OES readings agree to within 1-3 ppm for elements Mn, V, Ti, Sn, Cr, Ni, Cu, while the accuracy is lower for elements that show a reduced correlation (Zn and Ga, cf. FIG. 7). For Si and Fe, the results agree, on average, to within 20-30 ppm, representing an agreement better than approximately 5% and 2% of the average measured concentrations, respectively.

It should be emphasized that LIBS sampling and analysis was done on-site in the casting house within an aluminium plant, next to a trough with flowing aluminium, while OES measurements were carried out in a laboratory setting. This demonstrates how the inventive apparatus and method are highly suitable for direct process and quality control in metal processing and production facilities and have the potential to replace off-line laboratory analysis.

In summary, it can be stated that the present performance of the LIBS apparatus and method of the invention in terms of measurement precision and accuracy for many of the investigated elements is comparable to the high-end OES system used as a benchmark. The LIBS readings have been shown to be stable for months, without recalibration. The LIBS apparatus and method therefore show good promise to outperform lab measurements on process samples carried out using high-end OES systems, in addition to providing faster results and the possibility of real-time monitoring of impurity concentrations that are difficult or impossible to replicate with current laboratory methods.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise. Throughout the description and claims, the terms "comprising", "including", "having", and "containing" and their variations should be understood as meaning "including but not limited to", and are not intended to exclude other components.

The present invention also covers the exact terms, features, values, ranges, etc. in cases where these terms, features, values, ranges, etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one and multiple respective components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A non-contact, non-immersive method of measuring quantitatively one or more elements in a liquid metal or alloy sample, comprising:
    obtaining a sample of the liquid metal or alloy to be analysed,
    maintaining or placing the sample in a sample container which is substantially upwardly open,
    heating or maintaining the sample at or above a desired temperature,
    placing an instrument head such that the instrument head is fully above the sample surface and not immersed in the sample, wherein the instrument head comprises laser excitation optics that are connected to a laser, receiving optics for receiving emission from the sample, and an open-bottom chamber providing plasma confinement and stable environmental conditions through which the laser excitation optics guide laser light and wherein the instrument head is provided with a distance sensor,
    positioning the receiving optics at a pre-determined distance in the range from about 5 mm to about 100 mm from the sample surface such that emission from a particular part of the plasma plume is collected, wherein said receiving optics are arranged at an angle relative to the sample surface, in the range of about 30° to about 75°, and measuring with the distance sensor a distance to the sample surface and automatically moving the receiving optics to position the receiving optics at a pre-determined distance from the sample surface, directing a stream of inert gas through a gas channel into the open-bottom chamber, emitting one or more laser pulse on the sample through the excitation optics, receiving emitted light through the receiving optics from the sample and transmitting to a detector for recording spectral information of the detected light, comparing one or more selected emission peaks to calibration values in order to obtain quantitative determination of one or more elements.

2. The method according to claim 1, further comprising maintaining substantially consistent and inert atmospheric conditions around the sampling point.

3. The method according to claim 1, wherein the distance sensor is dynamically operated such that the distance to a sample surface is dynamically maintained and adjusted as necessary.

4. The method according to claim 1, wherein the laser excitation optics and receiving optics are fixedly arranged in a laser optics unit comprised in the instrument head, and wherein said positioning the receiving optics comprises positioning said laser optics unit.

5. The method according to claim 4, wherein the laser beam is focused at or near the sample surface when the laser optics unit is positioned.

6. The method according to claim 1, wherein the sample is heated or maintained at a temperature above at least 400° C.

7. The method according to claim 1, comprising heating the sample container with inductive heating.

8. The method according to claim 1, comprising arranging the sample container in contact with a surface of a source of liquid metal or alloy.

9. The method according to claim 1, wherein the sample being placed in the sample container has a volume in the range from about 1 mL to about 1000 mL.

10. The method according to claim 1, wherein said positioning of the receiving optics is arranged by moving the sample container towards the instrument head.

11. The method according to claim 1 wherein a trough, crucible or other open-top source containing the metal or alloy to be analysed functions as the sample container.

12. The method according to claim 9, wherein the sample surface is moving horizontally.

13. The method according to claim 1, wherein said positioning positions the receiving optics at the pre-determined distance from the sample surface which is a set distance with a margin of less than +50 μm.

14. The method according to claim 1, for determining in a liquid metal or alloy sample the content of one or more elements selected from Aluminium, Silicon, Phosphorus, Sulphur, Calcium, Chloride, Magnesium, Sodium, Titanium, Vanadium, Chromium, Manganese, Iron, Cobalt, Nickel, Copper, Zinc, Zirconium, Niobium, Molybdenum, Ruthenium, Rhodium, Palladium, Silver, Cadmium, Tin, Antimony, Wolfram, Rhenium, Iridium, Platinum, Gold, Mercury, Lead and Bismuth, Lithium, Beryllium and Boron.

15. The method according to claim 1 further comprising the step of emitting a series of laser pulses on a sampling point on the sample surface prior to said receiving emitted light.

16. The method according to claim 1, further comprising directing a stream of inert gas through a gas channel into the open-bottom chamber facing the sample surface through which chamber the laser pulses pass to the sample surface.

17. An apparatus for quantitatively measuring contact-free and without immersive probe one or more elements in a liquid metal or alloy sample, comprising an instrument head comprising laser excitation optics and receiving optics, an open-bottom chamber extending inwardly from a bottom surface of the instrument head a pulsed laser connected to said laser excitation optics, a spectrograph for resolving received emission, a detector connected to said spectrograph for recording spectral information, a gas channel or gas line for feeding a stream of inert gas to the open-bottom chamber, the instrument head and/or receiving optics being arranged on a vertically moveable support, the receiving optics having an associated distance sensor for measuring a distance to the surface of a sample in the sample container, so that the receiving optics can be positioned at a predetermined distance from the surface of a sample in the sample container, wherein the receiving optics are arranged at a distance from the sampling point of a sampling surface in the range from about 5 mm to about 100 mm and are arranged at an angle in the range of about 30-75° with respect to the sample surface.

18. The apparatus according to claim 17, further comprising a computer or control unit with means for receiving input from said distance sensor, and a moving mechanism to automatically move said moveable support controlled by said computer or control unit based on input from said distance sensor.

19. The apparatus according to claim 18, wherein said moving mechanism is able to move said moveable support with a precision of less than ±50 μm.

20. The apparatus according to claim 18, wherein said distance sensor and moving mechanism are dynamically operated to continuously maintain a pre-determined distance and adjust as necessary during operation.

21. The apparatus according to claim 17 wherein the laser excitation optics and receiving optics are fixedly arranged in an optics unit comprised in the instrument head.

22. The apparatus according to claim 21, wherein said optics unit is arranged on said moveable support within said instrument head.

23. The apparatus according to claim 17, wherein the instrument head is moveable and functions as said moveable support.

24. The apparatus according to claim 17 wherein the instrument head comprises a laser beam channel extending at least from the laser excitation optics to the open-bottom chamber, and an emission receiving channel that extends from the open-bottom chamber towards the receiving optics.

25. The apparatus according to claim 17, comprising a sample container configured to allowing heating and/or maintaining the sample at a temperature of at least 400° C.

26. The apparatus according to claim 25, wherein said sample container can hold a sample volume in the range from about 1 mL to about 1000 mL.

27. The apparatus according claim 25 wherein the sample container comprises heating means.

28. The apparatus according to claim 25, wherein said sample container is arranged on a moveable support.

29. The apparatus according to claim 25, wherein the sample container is adapted and arranged on a moveable support which is configured so that the sample container can be placed in contact with the surface of a source of liquid metal or alloy, and wherein the instrument head is moveable in at least two directions, so that the sample can be measured when the sample container is positioned in contact with said surface of a source of liquid metal or alloy.

30. The method according to claim 1, comprising positioning the receiving optics at a pre-determined distance in the range from about 10 mm to about 50 mm from the sample surface.

\* \* \* \* \*